H. J. BREEZE.
WHEEL.
APPLICATION FILED MAY 13, 1918.
1,314,462.
Patented Aug. 26, 1919.
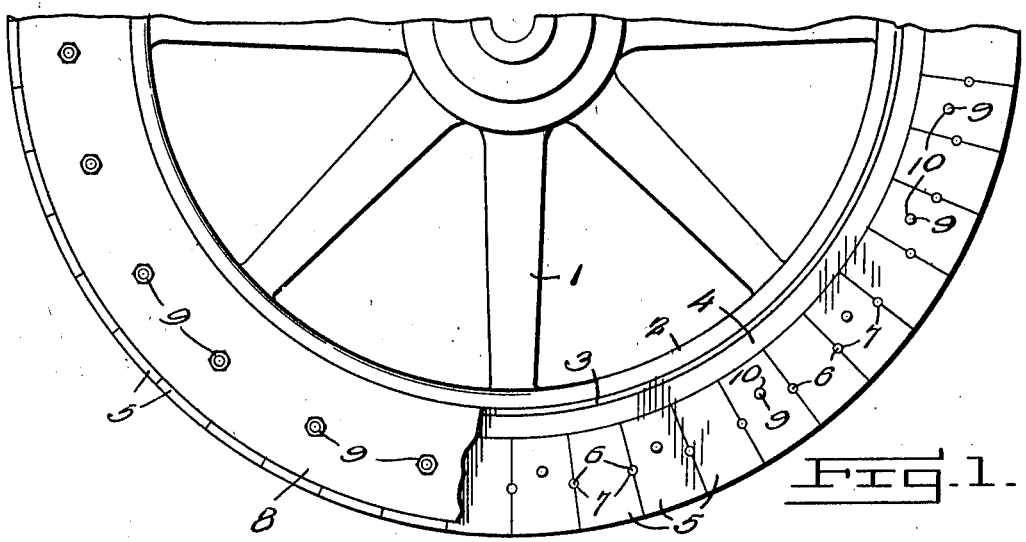
Fig. 1.
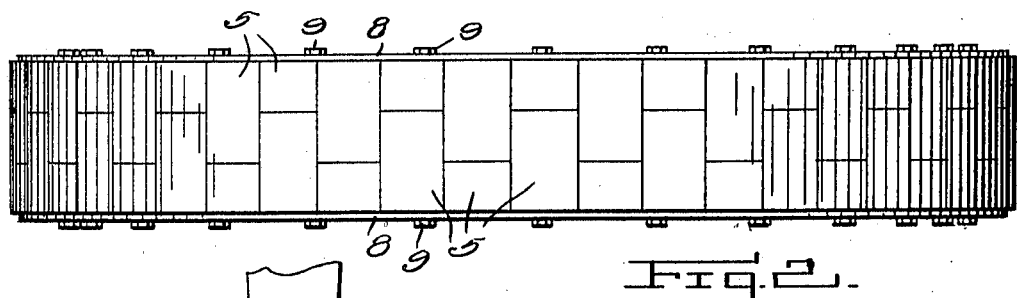
Fig. 2.
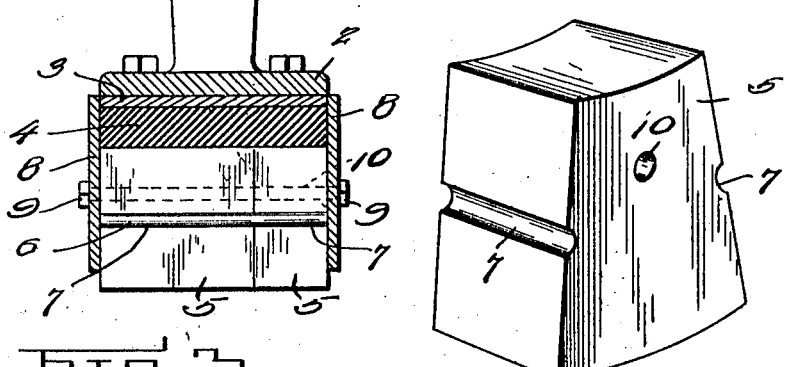
Fig. 3.
Fig. 4.
Inventor
H. J. Breeze.
Witnesses
Attorneys

UNITED STATES PATENT OFFICE.

HERBERT J. BREEZE, OF PORTLAND, OREGON.

WHEEL.

1,314,462.  Specification of Letters Patent.  Patented Aug. 26, 1919.

Application filed May 13, 1918. Serial No. 234,253.

*To all whom it may concern:*

Be it known that I, HERBERT J. BREEZE, a citizen of the United States, residing at Portland, in the county of Multnomah and State of Oregon, have invented new and useful Improvements in Wheels, of which the following is a specification.

My present invention pertains to wheels such as used on automobile trucks and more particularly to the rim and tire construction thereof; and it contemplates the provision of a rim and tire construction which is possessed of ample resiliency with a view to cushioning the wheel and yet is enabled to withstand travel over rough roads and other hard usage.

The invention also contemplates the provision of a rim and tire construction of such character that any one or more of the units making up the tread of the wheel may be readily removed and replaced by new units when necessary without disturbing the other units included in the tread.

Other advantageous features of the invention will be fully understood from the following description and claim when the same are read in connection with the drawings, accompanying and forming part of this specification, in which:

Figure 1 is a view in elevation and partly broken away showing about one half of a wheel constructed in accordance with my invention; it being understood that the remaining half of the wheel is of the same construction.

Fig. 2 is a plan of the perimeter of the wheel.

Fig. 3 is an enlarged detail cross-section showing one of the transverse keys and the tread units engaged thereby in elevation.

Fig. 4 is an enlarged perspective of one of the said tread units as the same appears when removed from the wheel.

Like numerals of reference designate corresponding parts in all of the views of the drawings.

The wheel 1 comprises conventional or any other suitable spokes and a felly 2 joined to the spokes in the conventional manner or any other manner compatible with the purpose of my invention. I would also have it here understood that the body 3 of my novel rim may be permanently affixed to the felly 2 or may be detachably connected to the said felly by radially disposed bolts such as shown in Fig. 3 or in any other approved manner, in the discretion of the manufacturer without involving departure from the scope of my invention as claimed.

In addition to the body 3 which surrounds the felly 2, my novel rim comprises annular side plates 8. One of these plates carries lateral keys 6, and the other plate abuts against the free ends of the said keys, or if preferred, some of the keys 6 may be carried by one plate and the alternate keys 6 by the other plate. It is advantageous, however, to have all of the keys which rest transversely of the rim on one of the plates 8, since when this arrangement is resorted to, the removal of the plate 8 that is not connected to the keys permits of the ready removal of any one or more of the tread units, hereinafter described, without disturbing the other tread units. The rim also comprises transverse bolts 9 which extend, by preference, through some of the tread units at the points 10 but not through all of the tread units, a base cushion 4 arranged against and surrounding the body 3, and wooden tread units 5 arranged with their inner ends opposed to the said cushion 4. The cushion 4 is preferably of about the thickness illustrated and extends the full distance between the side plates 8. It is composed of rubber or of any composition that is suitable to the purpose and is possessed of the requisite resiliency. The wooden tread units 5 are different in size but are similar in that each is provided with a slightly concave inner end and in that each has inwardly converging transverse sides, and also in that each is provided in its said sides with key seats 7, designed to receive the before described transverse keys 6. It will also be noticed by reference to Fig. 2 that I arrange the large and small tread units 5 in such manner as to break joints between the same, this being advantageous since it increases the strength and durability of the tread.

In forming the units 5, I cut the same lengthwise of the timber so that the cross-grain will be at the outer or tread end of each unit; and I also treat each unit with a suitable water-proofing compound, calculated to prevent swelling or contraction of the same.

By reason of the inward taper or wedge-like form of the tread units it will be manifest that the said units will fit snugly and support each other and together form a tread that is at once light in weight and possessed of great wearing qualities. It will also be observed that when one of the plates 8 is removed after the removal of the nuts employed on the bolts 9, any one or more of the tread units may be readily removed and as readily replaced with new tread units.

It will be gathered from the foregoing that my novel rim by virtue of the combination of resilient base 4 and tread units 5 is possessed of ample resiliency, and yet the only part of the rim subjected to wear is the tread that is formed entirely of the wooden units 5.

I would have it understood that the base may be formed of other than of resilient material, so as to adapt the device for use in rough farm work or such like work.

Having described my invention, what I claim and desire to secure by Letters-Patent, is:

A tire construction in which the tread is formed entirely of wooden units, comprising an annular side plate provided with a series of transversely extending keys arranged at intervals, a second annular side plate that abuts against the free end of each of the keys of the first named plate, wooden tread units of different sizes arranged in transverse pairs of large and small units, some of said units having apertures extending therethrough, a series of transversely positioned bolts extending through said apertures and both side plates, and transversely positioned seats formed in each side of the tread units adapted to receive the keys carried by the first named plate.

In testimony whereof I have hereunto set my hand in presence of two subscribing witnesses.

HERBERT J. BREEZE.

Witnesses:
JNO. C. NICKUM,
ALEX MARTIN.

Copies of this patent may be obtained for five cents each, by addressing the "Commissioner of Patents, Washington, D. C."